United States Patent
Maher (10) Patent No.: US 10,880,271 B2
(45) Date of Patent: Dec. 29, 2020

(54) SECURE NETWORK COMMUNICATION SYSTEM AND METHOD

(71) Applicant: Asavie R&D Limited, Dublin (IE)

(72) Inventor: Thomas Maher, Dublin (IE)

(73) Assignee: Asavie Technologies Limited, Dublin (IE)

( * ) Notice: Subject to any disclaimer, the term of this patent is extended or adjusted under 35 U.S.C. 154(b) by 486 days.

(21) Appl. No.: 15/244,074

(22) Filed: Aug. 23, 2016

(65) Prior Publication Data

US 2016/0359812 A1    Dec. 8, 2016

Related U.S. Application Data

(63) Continuation of application No. 11/920,903, filed as application No. PCT/EP2006/001681 on Feb. 20, 2006, now abandoned.

(30) Foreign Application Priority Data

Jun. 3, 2005    (IE) .................................. S2005/0376

(51) Int. Cl.
    *H04L 29/06*    (2006.01)
(52) U.S. Cl.
    CPC ...... *H04L 63/0281* (2013.01); *H04L 63/0272* (2013.01); *H04L 63/166* (2013.01); *H04L 67/42* (2013.01)
(58) Field of Classification Search
    CPC ... H04L 63/0281; H04L 67/42; H04L 63/166; H04L 63/0272
    See application file for complete search history.

(56) References Cited

U.S. PATENT DOCUMENTS

| 5,442,633 A | 8/1995 | Perkins et al. |
| 5,619,645 A | 4/1997 | Montenegro et al. |

(Continued)

OTHER PUBLICATIONS

Larry Korbat et al., "Towards Secure Agent Distribution and Communication," Proceedings of the 32nd Hawaii International Conference on System Sciences—1999, pp. 1-10. (Year: 1999).*

(Continued)

*Primary Examiner* — Luu T Pham
*Assistant Examiner* — Canh Le
(74) *Attorney, Agent, or Firm* — Withrow & Terranova, P.L.L.C.

(57) ABSTRACT

A secure network communication system and method for secure data exchange using TCP are disclosed. The system provides data exchange between a client and server, through an agent and broker interconnected to exchange data over an unsecured network. Upon receipt of a control packet from the client, the broker forwards a modified control packet to the agent using a secure protocol. The agent inspects the modified control packet and forwards it to the server. Upon receipt of a response packet from the server, the agent forwards the response packet to the broker using a secure protocol. Upon receipt of the response packet, the agent modifies the response packet and forwards it to the client. If the exchange of control packets indicates establishment of a TCP session, the agent and the broker establish a data channel between themselves to create a transparent TCP channel between the client and the server.

23 Claims, 3 Drawing Sheets

(56) References Cited

U.S. PATENT DOCUMENTS

| | | | |
|---|---|---|---|
| 5,623,601 A | 4/1997 | Vu | |
| 5,675,741 A | 10/1997 | Aggarwal et al. | |
| 5,781,550 A * | 7/1998 | Templin | H04L 63/0281 |
| | | | 370/401 |
| 5,793,763 A | 8/1998 | Mayes et al. | |
| 5,850,518 A | 12/1998 | Northrup | |
| 5,920,856 A | 7/1999 | Syeda-Mahmood | |
| 5,931,913 A | 8/1999 | Meriwether et al. | |
| 5,940,598 A | 8/1999 | Strauss et al. | |
| 6,003,084 A | 12/1999 | Green et al. | |
| 6,044,468 A * | 3/2000 | Osmond | H04L 41/0213 |
| | | | 380/281 |
| 6,070,187 A | 5/2000 | Subramaniam et al. | |
| 6,075,796 A | 6/2000 | Katseff et al. | |
| 6,157,959 A | 12/2000 | Bonham et al. | |
| 6,161,123 A | 12/2000 | Renouard et al. | |
| 6,185,680 B1 | 2/2001 | Shimbo et al. | |
| 6,192,395 B1 | 2/2001 | Lerner et al. | |
| 6,229,819 B1 | 5/2001 | Darland et al. | |
| 6,233,249 B1 | 5/2001 | Katseff et al. | |
| 6,397,254 B1 | 5/2002 | Northrup | |
| 6,421,705 B1 | 7/2002 | Northrup | |
| 6,584,083 B1 | 6/2003 | Toporek et al. | |
| 6,697,878 B1 | 2/2004 | Imai | |
| 6,886,046 B2 | 4/2005 | Stutz et al. | |
| 6,912,588 B1 | 6/2005 | Jardin et al. | |
| 6,928,471 B2 | 8/2005 | Pabari et al. | |
| 7,013,346 B1 | 3/2006 | Tucker | |
| 7,107,612 B1 * | 9/2006 | Xie | H04L 63/0263 |
| | | | 726/13 |
| 7,117,267 B2 | 10/2006 | Bavadekar | |
| 7,203,757 B2 | 4/2007 | Murakami | |
| 7,221,649 B2 | 5/2007 | Chen et al. | |
| 7,286,476 B2 | 10/2007 | Helmy et al. | |
| 7,401,159 B1 | 7/2008 | Aviani et al. | |
| 7,406,533 B2 | 7/2008 | Li et al. | |
| 7,433,344 B2 | 10/2008 | Lee et al. | |
| 7,475,124 B2 | 1/2009 | Jiang et al. | |
| 7,508,786 B2 | 3/2009 | Do | |
| 7,516,335 B2 | 4/2009 | Watanabe | |
| 7,529,812 B2 | 5/2009 | Hoyland et al. | |
| 7,565,526 B1 | 7/2009 | Shaw et al. | |
| 7,600,037 B2 | 10/2009 | Tucker | |
| 7,609,721 B2 | 10/2009 | Rao et al. | |
| 7,626,972 B2 | 12/2009 | Garani | |
| 7,656,799 B2 | 2/2010 | Samuels et al. | |
| 7,661,131 B1 * | 2/2010 | Shaw | H04L 63/029 |
| | | | 709/220 |
| 7,664,109 B2 | 2/2010 | Li | |
| 7,698,457 B2 | 4/2010 | Ghetie et al. | |
| 7,710,995 B2 | 5/2010 | Capone et al. | |
| 7,724,657 B2 | 5/2010 | Rao et al. | |
| 7,733,785 B2 | 6/2010 | Andreev et al. | |
| 7,743,159 B2 | 6/2010 | Catalfano et al. | |
| 2002/0035681 A1 | 3/2002 | Maturana et al. | |
| 2002/0042875 A1 * | 4/2002 | Shukla | H04L 29/12009 |
| | | | 713/151 |
| 2002/0064128 A1 | 5/2002 | Hughes et al. | |
| 2002/0167942 A1 | 11/2002 | Fulton | |
| 2003/0009571 A1 | 1/2003 | Bavadekar | |
| 2003/0014624 A1 | 1/2003 | Maturana et al. | |
| 2003/0028563 A1 | 2/2003 | Stutz et al. | |
| 2003/0028817 A1 * | 2/2003 | Suzuyama | H04L 29/1215 |
| | | | 714/4.1 |
| 2003/0167403 A1 | 9/2003 | McCurley et al. | |
| 2003/0177253 A1 | 9/2003 | Schuehler et al. | |
| 2003/0223433 A1 | 12/2003 | Lee et al. | |
| 2004/0001444 A1 | 1/2004 | Sadot et al. | |
| 2004/0057379 A1 | 3/2004 | Chen et al. | |
| 2004/0057433 A1 | 3/2004 | Daniel et al. | |
| 2004/0240451 A1 | 12/2004 | Lee et al. | |
| 2004/0243703 A1 | 12/2004 | Demmer et al. | |
| 2005/0021762 A1 | 1/2005 | Gbadegesin | |
| 2005/0055577 A1 | 3/2005 | Wesemann et al. | |
| 2005/0114541 A1 | 5/2005 | Ghetie et al. | |
| 2005/0197143 A1 | 9/2005 | Lee et al. | |
| 2005/0198308 A1 | 9/2005 | Hoyland et al. | |
| 2005/0198393 A1 | 9/2005 | Stutz et al. | |
| 2005/0216776 A1 | 9/2005 | Watanabe | |
| 2005/0262251 A1 | 11/2005 | Klemets et al. | |
| 2006/0037072 A1 | 2/2006 | Rao et al. | |
| 2006/0039354 A1 | 2/2006 | Rae et al. | |
| 2006/0039355 A1 | 2/2006 | Rao et al. | |
| 2006/0039356 A1 * | 2/2006 | Rao | H04L 43/0817 |
| | | | 370/352 |
| 2006/0039404 A1 | 2/2006 | Rao et al. | |
| 2006/0047839 A1 | 3/2006 | Tate et al. | |
| 2006/0053209 A1 | 3/2006 | Li | |
| 2006/0112185 A1 | 5/2006 | van Bemmel | |
| 2006/0155870 A1 | 7/2006 | Tucker | |
| 2006/0165029 A1 | 7/2006 | Melpignano et al. | |
| 2006/0190719 A1 | 8/2006 | Rao et al. | |
| 2006/0200547 A1 | 9/2006 | Edwards et al. | |
| 2006/0215685 A1 | 9/2006 | Capone | |
| 2006/0259602 A1 | 11/2006 | Stewart et al. | |
| 2007/0140159 A1 | 6/2007 | Eronen et al. | |
| 2007/0153827 A1 | 7/2007 | Lee | |
| 2007/0206615 A1 | 9/2007 | Plamondon et al. | |
| 2007/0223379 A1 * | 9/2007 | Sivakumar | H04L 47/27 |
| | | | 370/235 |
| 2007/0233877 A1 | 10/2007 | Qu et al. | |
| 2007/0239886 A1 | 10/2007 | Montemayor et al. | |
| 2007/0288487 A1 * | 12/2007 | Song | H04L 63/101 |
| 2008/0046616 A1 | 2/2008 | Verzunov et al. | |
| 2008/0130897 A1 | 6/2008 | Donatelli et al. | |
| 2008/0177888 A1 | 7/2008 | Catalfano et al. | |
| 2008/0181259 A1 | 7/2008 | Andreev et al. | |
| 2009/0086668 A1 | 4/2009 | Guan | |
| 2009/0106830 A1 | 4/2009 | Maher | |
| 2009/0132714 A1 | 5/2009 | Blander et al. | |
| 2009/0175197 A1 | 7/2009 | Nechushtan et al. | |
| 2009/0190586 A1 | 7/2009 | Kim | |
| 2010/0005288 A1 | 1/2010 | Rao et al. | |
| 2010/0095017 A1 | 4/2010 | Ghetie et al. | |
| 2010/0115102 A1 | 5/2010 | Kleo | |
| 2010/0153561 A1 | 6/2010 | Capone et al. | |
| 2010/0157926 A1 | 6/2010 | Eronen et al. | |

OTHER PUBLICATIONS

Sung-Moon Chung et al., "Isolationg System Faults on Vehicular Network Gateways Using Virtualization," 2010 IEEE/IFIP International Conference on Embedded and Ubiquitous Computing, pp. 791-796. (Year: 2010).*

Postel, J., "Internet Control Message Protocol: DARPA Internet Program Protocol Specification," Network Working Group, Request for Comments: 792, Version: 4, Sep. 1981, pp. 1-21.

Non-Final Office Action for U.S. Appl. No. 11/920,903, dated Oct. 8, 2010, 17 pages.

Final Office Action for U.S. Appl. No. 11/920,903, dated Aug. 3, 2011, 17 pages.

Advisory Action for U.S. Appl. No. 11/920,903, dated Nov. 21, 2011, 3 pages.

Non-Final Office Action for U.S. Appl. No. 11/920,903, dated Mar. 15, 2013, 16 pages.

Final Office Action for U.S. Appl. No. 11/920,903, dated Oct. 3, 2013, 18 pages.

Decision on Appeal for U.S. Appl. No. 11/920,903, dated Jun. 23, 2016, 11 pages.

International Search Report and Written Opinion for International Patent Application No. PCT/EP2006/001681, dated May 24, 2006, 7 pages.

International Preliminary Report on Patentability for International Patent Application No. PCT/EP2006/001681, dated Jul. 3, 2007, 10 pages.

* cited by examiner

SECURE NETWORK COMMUNICATION SYSTEM AND METHOD

This application is a continuation of U.S. patent application Ser. No. 11/920,903, filed Nov. 21, 2007, which is a national phase filing of International Application No. PCT/EP2006/001681, filed Feb. 20, 2006, which claims priority to Irish national application no. S2005/0376, filed Jun. 3, 2005, the disclosures of which are hereby incorporated herein by reference in their entirety.

This invention relates to a secure network communication system and method. In particular, it relates a communication system and method to enable secure clients to obtain secure and transparent access to a remote server over an insecure network.

It is widely recognised that connecting a computer to communicate with an insecure network such as the Internet represents a security risk. In order to perform useful tasks, such a computer must necessarily react to data that is received from remote servers over the network. Malicious attackers can exploit deficiencies in the computer's operating system and applications to react in such a way as to perform functions that might compromise the security or serviceability of the computer. Accordingly, it is normal for a private computer or network of computers is not connected directly to a public network. Rather, a connection is made to the network through some restrictive interface that controls the nature of the data that can be exchanged between the private computers and the unsecured network. The typical configuration of the hosts and networks is that client hosts are "inside" or trusted, while servers are "outside" or untrusted.

Two existing methods for enabling secure transparent gateway access between networks are by means of a proxy (for example, as disclosed in U.S. Pat. No. 5,623,601 and U.S. Pat. No. 5,781,550) and by network address translation (NAT) (for example, as disclosed in U.S. Pat. No. 5,793,763). In many cases, these arrangements provide an adequate service to "inside" users and computers. However, the service provided it is not the same as a direct network connection. In the case of a proxy, normally only connection to a configurable range of well-known ports on remote server are allowed. This can allow a network administrator to restrict the types of service a user of the network can access, and the client machines are hidden from the outside servers.

These known systems allow a network user to access outside services such as the Worldwide Web, Internet e-mail, and so forth, and so are selectively transparent to OSI application layer (Layer 7) protocols. However, they do not provide transparent connections to lower-level network protocols. In particular, at the OSI transport layer (Layer 4), at which the Transport Control Protocol (TCP) is commonly used and at the OSI network layer (Layer 3), at which the Internet Protocol (IP) is commonly used, these systems lack transparency. This can be a source of problems when the network is not operating normally, as, for example, when a TCP establishment fails.

The known implementation of a transparent proxy gateway is not fully transparent, particularly in regard to the TCP/IP control packets. For example, consider the case that a client completes the establishment of the connection between itself and a proxy before the proxy attempts to establish a connection to the destination host. If the proxy connection fails, then the established connection to the host is disconnected. The client sees therefore an incorrect view of the network, which for service discovery by clients of server services is of material importance. In this example, the client perceives the service port as open, which is not the case.

More recent developments in remote access have produced what are sometimes described as reverse proxies or gateways, where clients "outside" the network are authenticated and provided secure access to "inside" servers. However, the gateways are not transparent, requiring instead client-deployed, software, which negotiates connections with the reverse proxy.

An aim of this invention is to provide increased transparency, as compared with known systems, while maintaining security for the client systems. It is a particular aim of preferred embodiments of the invention to provide full TCP transparency at the client to permit automatic discovery of network resources.

From a first aspect, this invention provides a network gateway through which a client can communicate with a remote host using transport control protocol (TCP), in which data transmission system for secure data exchange using transmission control protocol between a client and a server, comprising an agent and a broker connected to exchange data over an unsecured network link, in which: upon receipt of a control packet from the client, the broker forwards a modified control packet to the agent using a secure protocol; the broker inspects the modified control packet and forwards it to the server; upon receipt of a response packet from the server, the agent forwards the response packet to the broker using a secure protocol; and upon receipt of the response packet, the broker modifies the response packet and forwards it to the client; wherein in the case that the exchange of control packets indicates establishment of a TCP session, the broker and the agent establish a data channel between themselves to create a transparent TCP channel between the client and the server.

Typically, the server is connected to the broker for exchange of data over a secured network—that is, an "inside" network. To protect the inside network, the secured network is typically connected to the unsecured network by one or more of a firewall, a proxy or a network address translation (NAT) device.

The secure protocol may employ a transport layer security (TLS) protocol. The TLS protocol may be used to carry secure hypertext transport protocol (HTTPS). This has the advantage that port 443, the port used for HTTPS, is typically left open on network firewalls and proxies. Alternatively, the HTTP CONNECT protocol may be used.

The control packets handled by the system include TCP SYN packets and TCP ACK packets. The response packets include TCP SYN ACK and TCP RST ACK packets. These are the packets principally involved in setting up a TCP session. The control packet and the response packet may be Internet Control Message Protocol packets. Such packets are typically involved in automatic discovery of network resources.

By suitable modification of the source and destination addresses within these packets, the data exchanged by the client and the server is similar to that which would be exchanged if the client and server were in direct communication.

In order to control the services and servers that a user can access, the broker applies rules to determine whether or not the control packet is forwarded to the agent. The rules may depend upon one or more of the originator of the packet, the target address of the packet, and the target port number of the packet.

Embodiments of the invention may be operative to service multiple virtual networks through a client access network. In such embodiments, the client access network is typically responsible for managing client access. The client access network may use one or both of standard AAA (Authorisation, Authentication and Accounting) and VPN services.

From a second aspect, the invention provides a data transmission system for secure data exchange using transmission control protocol between a client and a server, comprising an agent and a broker connected to exchange data over an unsecured network link, in which: upon receipt of a control packet from the client, the broker forwards a modified control packet to the agent using a secure protocol; the broker inspects the modified control packet and forwards it to the server; upon receipt of a response packet from the server, the agent forwards the response packet to the broker using a secure protocol; and upon receipt of the response packet, the broker modifies the response packet and forwards it to the client; wherein in the case that the exchange of control packets indicates establishment of a TCP session, the broker and the agent establish a data channel between themselves to create a transparent TCP channel between the client and the server.

An embodiment of the invention will now be described in detail, by way of example, with reference to the accompanying drawings, in which.

Figure 1:
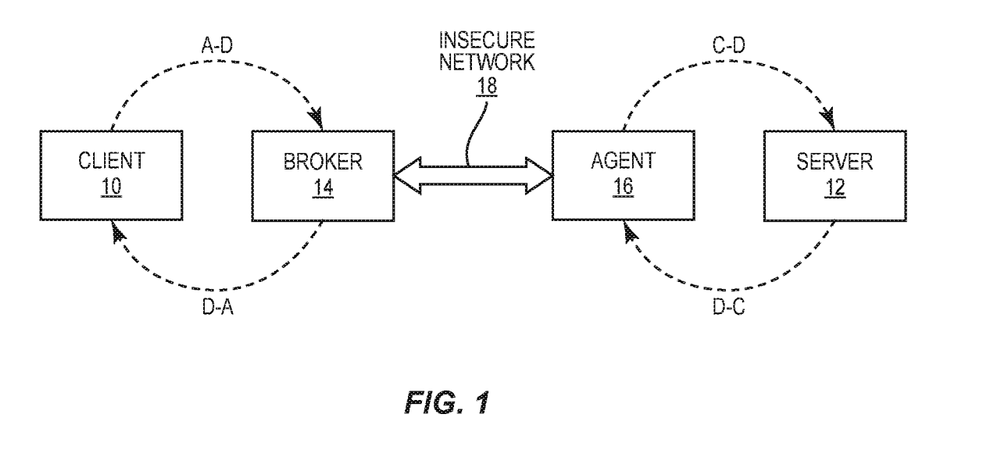
FIG. 1 is a diagram that illustrates communication between a and a server in a system embodying the invention.

With reference first to FIG. 1, a client 10 operating inside a secure network connects to an outside remote server 12 by way of a broker 14 and an agent 16. The broker 14 and agent 16 communicate over an insecure network 18, most usually including an Internet link.

In the system of FIG. 1, the client 10 is attempting to establish communication with the server 12. The broker 14 serves as an intervening Internet gateway, which "spoofs" the server 12. The broker 14 co-ordinates with the remote agent 16, using a secure application layer protocol. The agent 16 connects to the server 12 and acts as a client to the broker, and so must follow the broker's protocols, the nature of which will become apparent from the following description. Data from the client 10 to the server 12 therefore flows in connections from the client 10 to the broker 14, where they are routed and securely transported to the agent 16, where the data is carried in onward connections from the agent 16 to the server 12. The agents 16 connect to the broker 14 using a secure transport, such as TLS, in a manner that facilitates the traversal of intervening firewalls, proxies and NAT devices. The preferred approach is to use port 443, typically allowed for HTTPS traffic to secure Internet web servers.

The method used by the broker 14 and agent 16 to establish a transparent connection at the transport layer using TCP between the client 10 and the server 12 will now be described. In this embodiment (as is most typical) the transport layer protocol is the Transport Control Protocol (TCP).

As is well-known to those skilled in networking technology, a TCP session between a client 10 and a server 12 is set up by a client sending a synchronisation SYN packet to the server 12 and waiting for an acknowledgement ACK packet in return from the server 12. When the client 10 receives the ACK packet, it sends an ACK packet in response to the server 12. The method by which the broker 14 of this embodiment operates works by capturing TCP SYN packets at the IP layer and holding them while routing and policy decisions are made. If an agent-route for the TCP connection is found, the connection is offered to that agent 16, which can then attempt to make the connection, by generating its own TCP SYN packet. The agent 16 will get in response from the server one of: TCP SYN ACK, meaning that the connection is established; TCP RST ACK, meaning that the connection is refused; or ICMP packet, meaning that the network, host or port is unreachable.

If the connection succeeds, the agent 16 establishes a data session for the connection traffic to be transferred between broker and agent, and the agent then informs the broker 14 to accept the TCP connection requested by the client 10. The broker 14 then releases the original TCP SYN packet, where the system employs a conventional transparent proxy to terminate the TCP connection at the broker. All data from the client 10 is passed to the agent 16 through the agent-established data session, where the agent 16 passes the data to the other side of the proxy, towards the server. A similar process operates in the reverse path.

If the connection fails, then the agent 16 informs the broker 14 as to the type of failure. The broker consumes the original TCP SYN packet and generates a new IP packet to be sent to the client 10. The new packet 10 is so constructed that it is a replica of the condition detected by the agent 16: that is, TCP RST ACK, or an ICMP packet. Correct information relating to the connection failure is therefore returned to the client 10. In the case of a TCP RST ACK packet, the packet is addressed so that it appears to the client 10 to have originated from the destination host. In the case of an ICMP packet, the packet is addressed so that it appears to the client 10 to have originated from the gateway address of the broker 14 and carries the first 64 bytes of the original TCP SYN packet, as required by the ICMP protocol defined in RFC 792. In this manner, the brokered gateway is completely transparent to the client 10 at TCP level.

The method used by the broker 14 and agent 16 to establish a transparent connection at the network layer for Internet Control Message Protocol (ICMP) between the client 10 and the server 12 will now be described.

ICMP is a mandatory requirement for gateway devices. The embodiment supports ICMP by consuming ICMP packets, interpreting them at the application layer, and if necessary creating an application layer protocol message exchange from the broker 14 to an agent 16.

For example, assume that the client 10 wishes to ping the server 12. It does this by sending an ICMP echo request message, with payload, from the client 10 to the server 12. The ICMP message is consumed by the broker 14, where it is parsed to determine its type. In this case, it will be identified as a PING request. The destination address (the server 12) is looked up and a routing decision is made to generate a PING message to the agent 16, over the secure transport layer protocol. The agent 16, on receipt of the PING message completes the request by generating an ICMP echo request message from itself to the server 12. On receipt of an ICMP echo reply, the agent 16 responds with an "OK" response to the PING. At the broker 14, the application layer response to the PING message determines the ICMP response to the original ICMP request message: ICMP echo reply (server 12 to client 10); or ICMP unreachable (broker 12 to client 10). An ICMP echo request to the gateway address is handled by the broker 14, without the need to route to an agent 16. Other ICMP messages are handled in a similar fashion, so making the embodiment ICMP transparent.

The method used by the broker 14 and agent 16 to establish a transparent connection at the network layer for the User Datagram Protocol (UDP) between the client 10 and the server 12 will now be described.

UDP, the User Datagram Protocol, is a very simple protocol that allows a packet of data, known as a datagram, to be sent from one host to another. The embodiment supports UDP by consuming defragmented UDP packets at the broker 14, and routing appropriately to agents 16.

Assume that the client 10 sends a UDP datagram to the server 12. The broker 14 consumes the datagram and relays the datagram to the agent 16, from where the datagram is relayed to the server 12, having the address of the agent 16 as its source address and an agent-selected source relay port. Datagram replies follow the reverse path from the server 12 to the agent-selected relay port on the agent 16. The agent 16 receives the reply and transports the datagram to the broker 14 using the secure transport. The datagram reply is sent to the client 10 having as its source address that of the server 12.

When a broker identifies which agent to which a datagram should be routed, it requests the establishment of a datagram relay. To establish a datagram relay, an agent first establishes a named datagram session between itself and the serving broker. The agent, if it accepts the relay request, responds with the name of the datagram session allocated to the datagram relay. The broker then sends the datagram, as a full IP packet, over the named datagram session, and stores the relay details (protocol=UDP, source address, source port, destination address, destination port). The agent sends the datagram to the final destination server using the established datagram relay.

An established datagram relay supports replies in the return direction, where the agent receives the reply and sends the datagram, as a complete IP packet, over the named datagram session. The broker is responsible for packet fragmentation and raw transmission of the datagram to the host.

The datagram session between broker and agent is a bi-direction secure pipe. The pipe is reliable. Datagram transports however should by definition be unreliable. Therefore, within the embodiment, strategies are employed on the datagram sessions to mimic unreliability. A flow-control protocol is implemented over the datagram session to provide end-to-end information on the number of outstanding bytes between the datagram session peers. If, for any reason, there is congestion in the datagram sessions, the peers will drop datagrams. If an underlying datagram session disconnects, pending datagrams are dropped. Other known traffic management strategies can be implemented at the broker and agent. For example, the embodiment may implement "ageing" of datagrams: that is, datagrams are dropped if the length of time they have been queued exceeds a configurable threshold.

While the embodiment described above supports UDP, the principle of operation is easily extensible to any datagram-based service.

The embodiment supports the ability for multiple virtual networks to be serviced by a brokered network gateway through a client access network. The client access network is responsible for managing client access, for example through a combination of standard AAA (Authorisation, Authentication and Accounting) services such as RADIUS, and VPN services such as IPSec or MPLS.

Each virtual network consists of a number of clients 10, agents 14 and a virtual gateway IP address. The broker restricts client access to within the client's virtual network. The client's identity is determined by IP source address (non-overlapping client-side IP address range). Each virtual network operates on an overlapped server-side IP address range as communication between clients and servers are within the context of the virtual network. Client trust relationships to a virtual network can be established dynamically through existing AAA services, using either static or dynamic IP address assignment.

Figure 2:
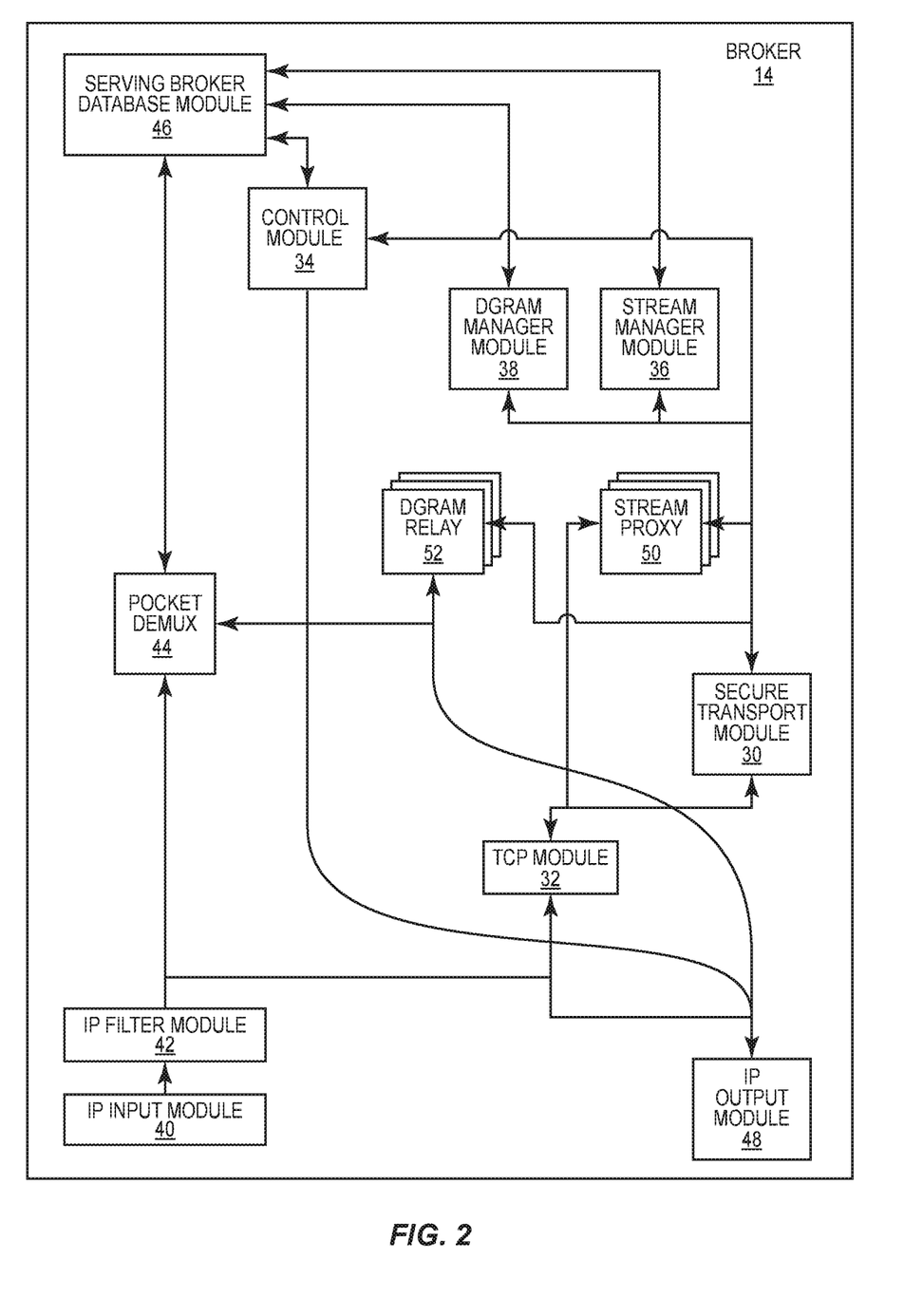
FIG. 2 is a block diagram of a broker being a component of a system embodying the invention.

The structure of the broker 14 will now be described with reference to FIG. 2.

The broker 14 is currently implemented on a server computer running the Linux operating system.

Agents 16 establish and maintain a control session over a secure transport (TLS over TCP, in this embodiment) and a number of dynamic data sessions. A secure transport module 30 is responsible for providing a secure transport, interacting with the TCP module 32 of the Linux kernel, which in turn receives and transmits IP packets via "IP INPUT" and "IP OUTPUT" respectively.

On a serving broker, control sessions are maintained by a control module 34. Data sessions are of two forms, STREAM sessions and DGRAM sessions. On an operational broker, STREAM sessions are maintained by a STREAM manager module 36 and DGRAM sessions are maintained, by a DGRAM manager module 38. Agents are responsible for the establishment of all sessions, therefore enabling traversal of intervening firewalls and proxies. Data sessions can be established on demand or pre-connected.

All IP traffic passes through the kernel; inward IP traffic passes through an IP INPUT module 40, where it is passed to an IP Filter (PREROUTING) module 42. Using iptables, the Linux kernel packet filtering module, rules are established to queue packets to the application layer module, called Packet DeMux 44.

The module Packet DeMux 44, based on information maintained by a serving broker database module 46 is used to determine how to process each packet passing though the broker, based on the IP protocol, the originating client, destination server and depending on protocol the source and destination protocol ports.

The Packet DeMux module 44 also implements an application-layer, configurable packet filter (firewall) based on Access Control List (ACL) rules stored in the serving broker database 46. The present embodiment supports per-client defined ACLs and per-network ACLs.

When the broker is handling TCP packets, only SYN packets are queued on the input of the Packet DeMux module 44. If a TCP SYN packet represents a valid new TCP connection for a valid client (as defined by the contents of the serving broker database 46), a SYN message, with the details of the packet, are passed to the control module 34. The control nodule 34 locates a valid agent control session, and offers the new TCP connection through the established control session. If no agent route is found, then the control module 34 generates a raw ICMP Unreachable packet for transmission to the originator of the TCP request through an IP output module 48.

If an agent's response to a new TCP connection is "OK", then the assigned STREAM session is located in the serving broker database 44 and set to be in a "parked" state, saving the TCP connection details. A message is then sent to the Packet DeMux module 44 to instruct it to respond to the original TCP SYN packet with an "ACCEPT", allowing the TCP SYN packet to reach the kernel TCP module 32. The IP Filter (PREROUTING) module 42 module is configured to operate as a transparently proxy, using destination NAT, to a transparent proxy port, on which the stream manager module 36 listens. The stream manager module 36 accepts the new TCP connection and asks the IP Filter (PREROUTING) 42 module what the original destination address of the connection was. Based on the source and the destination addresses and ports, the parked STREAM session is located and unparked. The established proxy is sent to a stream proxy 50 to manage until the connection is finished.

If the agent's response to a new TCP connection is "REFUSE", then the control module 34 sends a message to the Packet DeMux module 44 to refuse the TCP connection. In this case, the original TCP SYN packet is modified into a TCP RST packet and the source and destination are swapped to reflect the packet to the client. The original packet is then consumed (DROP) and the modified packet is sent to the IP OUTPUT module 48.

If the agent's response to a new TCP connection is "UNREACHABLE", then the control module 34 sends a message to the Packet DeMux module 44 to respond to the TCP SYN with an ICMP UNREACH packet. In this case the original TCP SYN packet is modified into an ICMP UNREACH packet and the source and destination are swapped to reflect the packet to the client. The first 64 bytes of the original TCP SYN packet are copied into the modified ICMP UNREACH packet according to the ICMP specification. The original packet is then consumed (DROP) and the modified packet is sent to the IP OUTPUT module 48.

Handling of ICMP will now be described. ICMP packets are queued by the IP Filter (PREROUTING) module 42 to the Packet DeMux module 44. In the case of an ICMP Echo Request, a "PING" message is sent to the control module 34, where a "PING" message is sent, through an established CONTROL session to a selected (routed) agent, based on information in the serving broker database 46. The original ICMP Echo Request is dropped.

Depending on the agent's response to the PING, a new ICMP message is created and sent to the client as a raw IP packet through the IP OUTPUT module 48.

Handling of UDP will now be described. UDP packets are queued by the IP Filter (PREROUTING) module 42 to the Packet DeMux module 44. The "IP Filter (PREROUTING) module 44 defragments the UDP packets. However, an alternative implementation could allow defragmentation to occur in the Packet DeMux module 44. The information in the IP and UDP headers of the UDP datagram are used to select/lookup an established datagram association (DA) in the serving broker database 46. If a DA is found, then information in the DA determines either that the datagram should be discarded, or forwarded directly to an assigned DGRAM RELAY 52. If no DA is found, then a new DA is created, and the datagram packet is forward to the control module 34. The control module 34, using information in the serving broker database 46 determines which agent to request the establishment of a new datagram relay.

If the agent responds with "OK", then the DGRAM session assigned is located in the serving broker database 46 and the DA is bound a DGRAM RELAY 52. The original packet is then forwarded to the DGRAM RELAY 52.

If the agent responds with "REFUSE", then the datagram packet is discarded and the DA is marked "discard". The "discard" condition is timer managed, causing the DA to be automatically destroyed after a configurable period of time.

The DGRAM RELAY 52 is responsible for managing traffic over DGRAM sessions. Each DGRAM RELAY 52 implements flow-control, DA maintenance, and traffic management strategies. Any IP datagram can be transported over a DGRAM session. Datagrams in the reverse path (agent to client) are received by a DGRAM RELAY 52 and transmitted, after fragmentation, via the IP OUTPUT module 48.

Virtual networks are assigned to one of a number of deployed serving brokers. Agents can use a registration service to discover the serving broker assigned as a gateway to the agent's virtual network. In this way an embodiment of the invention can be scaled to support a large number of clients, agents and virtual networks. In the preferred embodiment, the registration service is implemented using secure web-service (using HTTPS methods).

Figure 3:
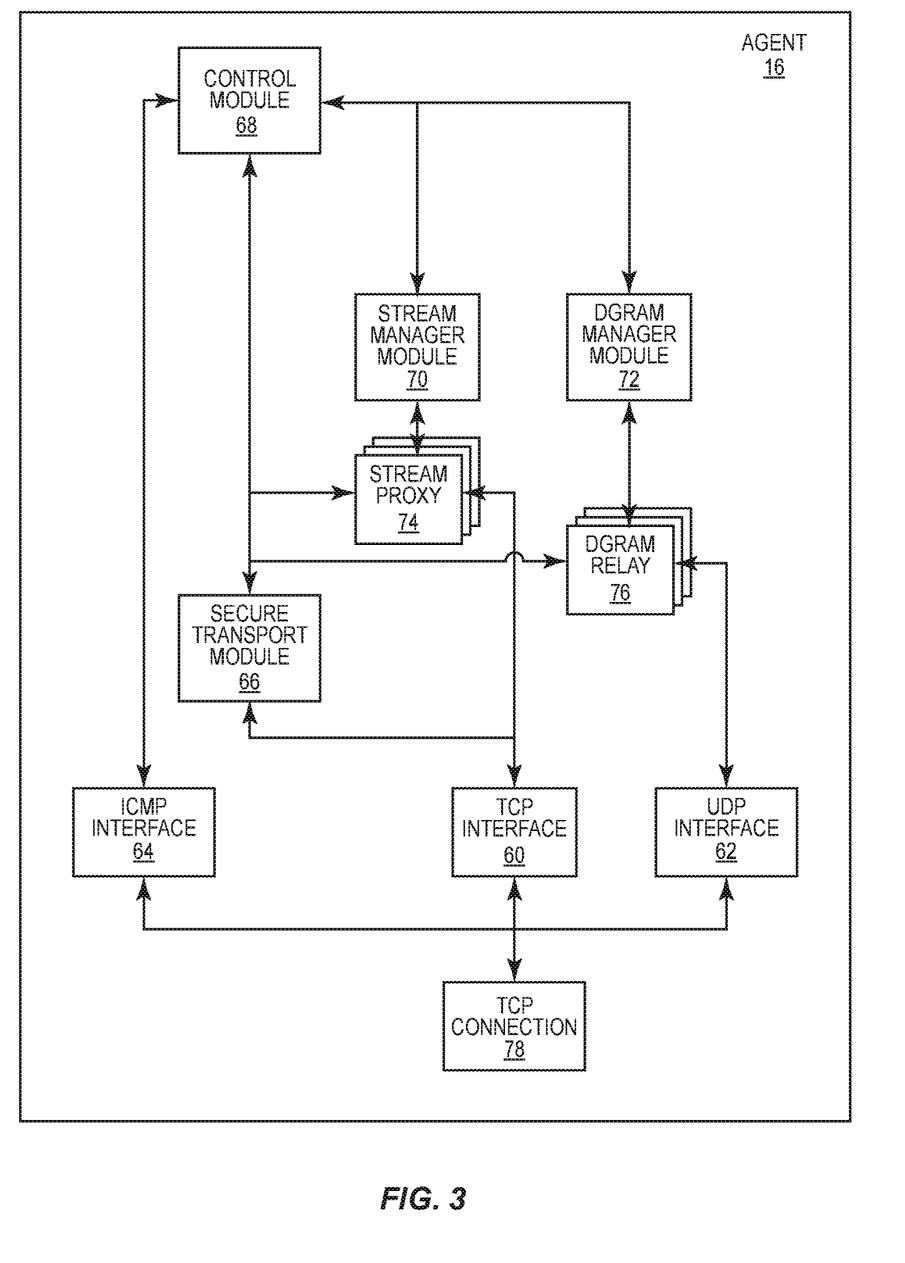
FIG. 3 is a block diagram of an agent being a component of a system embodying the invention.

The agent can be implemented on any platform that provides a TCP/IP network stack, for example, a computer running Windows®, Linux®, Unix®, Apple® Operating System or a Java® virtual machine The generic structure of an agent is shown in the FIG. 3. The platform must provide interfaces to TCP/IP. In FIG. 3, TCP interface 60, UDP interface 62 and ICMP interface 64 of the native TCP/IP stack are shown separately for clarity.

All traffic between the agent 16 and serving broker 14 is established as outbound (agent to serving broker) secure connections using the SECURE TRANSPORT module 66, which provides TLS over TCP in the preferred embodiment. Since agents are responsible for traversing intervening proxies between the agent 16 and serving broker 14, an agent must include proxy connection functionality, the functionality for which can be included in the SECURE TRANSPORT module 66, or as an alternative be included in a separate proxy module. An agent should implement HTTP CONNECT proxy functionality as a minimum.

On an agent 16, control sessions are maintained by a CONTROL module 68. Data sessions are of two forms, STREAM sessions, managed by a STREAM MANAGER module 70, and DGARM sessions, managed by a DGRAM MANAGER 72.

The CONTROL module 68 of the agent 16 establishes and maintains a single secure control session via the SECURE TRANPORT module 66. The CONTROL module 68 listens for control messages from the broker 14 over the control session. The CONTROL module 68 should be capable of handling multiple serving broker messages concurrently.

If a serving broker 14 sends a PING message, then the CONTROL module 68 will initiate an ICMP ping from the agent 16 to the destination through the TCP/IP ICMP interface 60. Someone proficient in the technical field will realise that an ICMP ping is typically only allowed by processes with elevated or administrator rights. As a result, an agent 16 must typically run in a context with elevated or administrator rights. The response to the ICMP will be related back to the serving broker 14 in a response message.

If a serving broker 14 sends a TCP CONNECT message to the agent 16, then the CONTROL module 68 requests a TCP connection by way of the STREAM manager module 70. The STREAM MANAGER module 70 must first attempt to connect to the specified destination. If the connection succeeds, then the STREAM MANAGER module 70 will connect a STREAM session to the serving broker 14 and notify the CONTROL module 68 of the success and the STREAM session that is responsible for the TCP connection. The STREAM MANAGER module 70 then creates a STREAM PROXY 74 to shunt data back-and-forth between the STREAM session and local TCP connection 78. If however the TCP connection fails, then the STREAM MANAGER module 70 notifies the CONTROL module 68, which sends the appropriate error response message. Alternatively, an agent 16 STREAM MANAGER module 70 can pre-connect STREAM sessions to the serving broker 16 and allocate pre-connected STREAM sessions when needed, in this manner TCP connection establishment times can be improved.

If a serving broker 14 sends a UDP CONNECT message to the agent 16 then the CONTROL module 68 requests a UDP Datagram Association (DA) via the DGRAM manager 72. The DGRAM MANAGER 72 assigns the DA to a DGRAM RELAY 76. If the DGRAM RELAY 76 does not already have a DGRAM session to the serving broker 14, then it is established now. A DGRAM RELAY 76 is capable of managing multiple DAs. The DGRAM MANAGER 72 sends a response message to the serving broker 14 identifying the DGRAM session to which to bind the DA of the serving broker 14.

The DGRAM RELAY 76 of the agent 16 preferably implements a timer function to monitor DAs that are alive and unbind DAs that are no longer being used. When a DA is unbound, the DGRAM RELAY 76 of the agent 16 sends the DGRAM RELAY 52 of the serving broker 14 a message to that effect. After the DA has been unbound, any traffic for the unbound DA is discarded.

In practice, most UDP protocols are one-shot command-response style protocols. With this in mind, an agent could implement a very short idle time-out initially, for example 30 seconds, and then if there are multiple datagrams exchanged, extend the idle timeout. For example, after two response datagrams, the agent 16 may extend the idle timeout for that DA to 15 minutes.

Both brokers 16 and agents 14 are, in this embodiment, identified and mutually authenticated using X.509 digital certificates. Routing in the system may be based on a destination address or network service.

What is claimed is:

1. A data transmission system for secure data exchange using transmission control protocol (TCP) comprising:
    a broker computing device connected to a client computing device;
    an agent computing device connected to a server computing device;
    an unsecured network link between the broker computing device and the agent computing device, wherein:
        the agent computing device and the broker computing device are connected through at least a firewall device to exchange data over the unsecured network link;
        the agent computing device is operative to establish a secure control session with the broker computing device using a secure transport over the unsecured network link;
        upon receipt of a TCP Synchronize (SYN) packet from the client computing device, the broker computing device is operative to capture the TCP SYN packet, generate a modified control packet based on the TCP SYN packet, and send the modified control packet to the agent computing device using the secure control session;
        the agent computing device is operative to receive the modified control packet from the broker computing device, generate a new TCP SYN packet based on the modified control packet, and send the new TCP SYN packet to the server computing device;
        upon receipt of a first response packet from the server computing device, the agent computing device is operative to send a second response packet to the broker computing device using the secure control session;
        upon receipt of the second response packet from the agent computing device, the broker computing device is operative to send a third response packet to the client computing device, wherein in the case that an exchange of TCP control packets between the agent computing device and the server computing device indicates establishment of a TCP session, the agent computing device is operative to establish a data channel between the agent computing device and the broker computing device to create a transparent TCP channel between the client computing device and the server computing device and in the case that an exchange of TCP control packets between the agent computing device and the server computing device indicates failure to establish a TCP session, the third response packet forwarded by the broker computing device to the client computing device indicates that a connection has failed.

2. The data transmission system of claim 1 wherein the broker computing device is connected to the client computing device via a first secure connection and the agent computing device is connected to the server computing device via a second secure connection.

3. The data transmission system of claim 1 wherein the secure control session is a transport layer security (TLS) protocol connection over TCP port 443.

4. The data transmission system of claim 3 wherein the TLS protocol connection is made over a local proxy.

5. The data transmission system of claim 4 wherein the local proxy uses an HTTP CONNECT protocol.

6. The data transmission system of claim 1 wherein the first response packet, the second response packet, and the third response packet are one of TCP SYN Acknowledge (ACK) packets, TCP Reset (RST) ACK packets, and Internet Control Message Protocol (ICMP) packets.

7. The data transmission system of claim 1 wherein:
    in the case that the exchange of TCP control packets between the agent computing device and the server computing device indicates failure to establish a TCP session, the agent computing device is configured to inform the broker computing device of a type of failure that occurred; and
    in response to receipt of the type of failure, the broker computing device is configured to generate an error packet indicating the type of failure and send the error packet to the client computing device.

8. The data transmission system of claim 7 wherein if the type of failure indicates that the server computing device refused the connection, the error packet is generated such that it appears to have originated from the server computing device..

9. The data transmission system of claim 8 wherein if the type of failure indicates that the server computing device is unreachable, the error packet is generated such that it appears to have originated from the broker computing device.

10. A data transmission system for secure data exchange comprising:
    a client computing device;
    a broker computing device connected to the client computing device via a first secure network link;

a server computing device;
an agent computing device connected to the server computing device via a second secure network link and connected to the broker computing device via an unsecured network link; and
one or more of a firewall, a proxy, and a network address translation (NAT) device connected between the broker computing device and the agent computing device, wherein:
the agent computing device is configured to initiate a secure control session with the broker computing device over the unsecured network link;
the client computing device is configured to send a control packet to the broker computing device via the first secure network link;
in response to receipt of the control packet, the broker computing device is configured to generate and send a modified version of the control packet to the agent computing device via the unsecured network link using the secure control session;
in response to receipt of the modified version of the control packet, the agent computing device is configured to initiate a connection with the server computing device via the second secure network link;
in response to establishment of the connection between the agent computing device and the server computing device, the agent computing device is configured to initiate a secure data session with the broker computing device via the unsecured network link and the one or more of the firewall, the proxy, and the NAT device; and
in response to establishment of the secure data session between the agent computing device and the broker computing device, the broker computing device is configured to send a response to the control packet from the client computing device such that a connection is established between the client computing device and the broker computing device.

11. The data transmission system of claim 10 wherein initiating the connection with the server computing device via the second secure network link comprises generating a new control packet and sending the new control packet to the server computing device.

12. The data transmission system of claim 11 wherein the new control packet is a Transport Control Protocol Synchronize (TCP SYN) packet.

13. The data transmission system of claim 11 wherein the control packet, the modified version of the control packet, and the new control packet are Transport Control Protocol Synchronize (TCP SYN) packets.

14. The data transmission system of claim 10 wherein:
in response to failure of the connection between the agent computing device and the server computing device, the agent computing device is configured to inform the broker computing device of a type of failure that occurred; and
in response to receipt of the type of failure, the broker computing device is configured to generate an error packet indicating the type of failure and send the error packet to the client computing device.

15. The data transmission system of claim 14 wherein if the type of failure indicates that the server computing device refused the connection, the error packet is generated such that it appears to have originated from the server computing device.

16. The data transmission system of claim 15 wherein if the type of failure indicates that the server computing device is unreachable, the error packet is generated such that it appears to have originated from the broker computing device.

17. The data transmission system of claim 16 wherein initiating the connection with the server computing device via the second secure network link comprises generating a new control packet and sending the new control packet to the server computing device.

18. A method for facilitating secure data exchange between a client computing device and a server computing device, the method comprising:
establishing a secure control session from an agent computing device to a broker computing device via an unsecured network link and one or more of a firewall, a proxy, and a network address translation (NAT) device;
sending a control packet from the client computing device to the broker computing device via a first secure network link;
in response to receipt of the control packet, generating a modified version of the control packet at the broker computing device and sending the modified version of the control packet to the agent computing device via the unsecured network link and the one or more of the firewall, the proxy, and the network address translation (NAT) device using the secure control session established by the agent computing device;
in response to receipt of the modified version of the control packet, initiating a connection from the agent computing device to the server computing device via a second secure network link;
in response to establishment of the connection between the agent computing device and the server computing device, initiating a secure data session from the agent computing device to the broker computing device via the unsecured network link and the one or more of the firewall, the proxy, and the NAT device; and
in response to establishment of the secure data session between the agent computing device and the broker computing device, sending a response to the control packet from the broker computing device to the client computing device such that a connection is established between the client computing device and the broker computing device.

19. The method of claim 18 wherein initiating the connection from the agent computing device to the server computing device comprises generating a new control packet at the agent computing device and sending the new control packet to the server computing device.

20. The method of claim 18 further comprising:
in response to failure of the connection between the agent computing device and the server computing device, informing the broker computing device of a type of failure that occurred; and
in response to receipt of the type of failure, generating an error packet indicating the type of failure at the broker computing device and sending the error packet to the client computing device.

21. The method of claim 20 wherein if the type of failure indicates that the server computing device refused the connection, the error packet is generated such that it appears to have originated from the server computing device.

22. The method of claim 21 wherein if the type of failure indicates that the server computing device is unreachable, the error packet is generated such that it appears to have originated from the broker computing device.

23. The method of claim 22 wherein initiating the connection between the agent computing device and the server computing device comprises generating a new control packet at the agent computing device and sending the new control packet to the server computing device.

\* \* \* \* \*